US012173876B1

(12) United States Patent
Wen

(10) Patent No.: US 12,173,876 B1
(45) Date of Patent: Dec. 24, 2024

(54) LIGHTING DEVICE

(71) Applicant: Ruiwen Wen, Jieyang (CN)

(72) Inventor: Ruiwen Wen, Jieyang (CN)

( * ) Notice: Subject to any disclaimer, the term of this patent is extended or adjusted under 35 U.S.C. 154(b) by 0 days.

(21) Appl. No.: 18/806,901

(22) Filed: Aug. 16, 2024

(30) Foreign Application Priority Data

Aug. 7, 2024 (CN) ......................... 202421909649.0

(51) Int. Cl.
*F21V 23/00* (2015.01)
*F21S 4/10* (2016.01)
*F21V 23/02* (2006.01)

(52) U.S. Cl.
CPC .............. *F21V 23/002* (2013.01); *F21S 4/10* (2016.01); *F21V 23/02* (2013.01)

(58) Field of Classification Search
CPC ...... F21V 23/002; F21V 23/02; F21V 23/001; F21V 23/00; F21V 23/04; F21V 23/0414; F21V 23/06; F21S 4/10; F21S 4/00; F21S 4/15
See application file for complete search history.

(56) References Cited

U.S. PATENT DOCUMENTS

2011/0006704 A1* 1/2011 Kim .......................... F21S 4/10 315/294
2017/0202061 A1* 7/2017 Allen .................... F21V 23/001

* cited by examiner

*Primary Examiner* — Bao Q Truong
(74) *Attorney, Agent, or Firm* — Daniel M. Cohn; Howard M. Cohn

(57) ABSTRACT

A lighting device includes a lighting assembly and a power control assembly. The lighting assembly includes a first wire, a second wire, and a light source electrically connected to the first wire and the second wire. The power control assembly includes a housing, a first power supply disposed in the housing, a conductive structure, and an insulating piece. The insulating piece is disposed between the first power supply and the conductive structure. The insulating piece partially extends out of the housing. The insulating piece is capable of switching between an isolation position and a released position under driving of an external force. When the insulating piece is located at the released position, the conductive structure contact the first power supply to form a closed circuit. When the insulating piece is located at the isolation position, the conductive structure does not contact the first power supply.

20 Claims, 5 Drawing Sheets

LIGHTING DEVICE

TECHNICAL FIELD

The present disclosure relates to a technical field of lighting equipment, and in particular to a lighting device.

BACKGROUND

Lighting devices are able to provide soft ambient light effects and are often used for interior decoration, home lighting, commercial space decoration, etc.

In the prior art, the lighting devices are commonly connected to sockets through a plug thereof to provide power to a light source thereof, which is inconvenient for mounting and use of the lighting devices.

SUMMARY

Embodiments of the present disclosure provide a lighting device that is allowed to be used in different scenarios, which improves convenience and diversity of using the lighting device, facilitates a control of turning on and off a light source thereof, and is simple to use.

The present disclosure provides a lighting device. The lighting device comprises a lighting assembly and a power control assembly.

The lighting assembly comprises a first wire, a second wire, and a light source. The light source is electrically connected to the first wire and the second wire.

The power control assembly comprises a housing, a first power supply, a conductive structure, and an insulating piece. The first power supply is disposed in the housing. The insulating piece is disposed between the first power supply and the conductive structure. The insulating piece partially extends out of the housing. The insulating piece is capable of switching between an isolation position and a released position under driving of an external force. The first wire is electrically connected to the first power supply. The second wire is electrically connected to the conductive structure. When the insulating piece is located at the released position, the conductive structure and the first power supply are in contact with each other to form a closed circuit. When the insulating piece is located at the isolation position, the conductive structure and the first power supply are not in contact with each other, and the closed circuit is not formed.

In the present disclosure, the insulating piece is designed to be movable so that the insulating piece is capable of being switched between the isolation position and the released position. When the insulating piece is in the isolation position, the insulating piece isolates the first power supply and the conductive structure, which effectively prevents accidental electric shock or short circuit and improves safety of the lighting device.

Moreover, since the insulating piece blocks contact between the first power supply and the conductive structure when the insulating piece is in the isolation position, a possibility of accidental contact between the first power supply and the conductive structure or circuit failure caused by external factors (such as dust, moisture, etc.) is reduced, and reliability of the lighting device is enhanced. When the insulating piece is in the released position, the conductive structure is connected to the first power supply, so that the closed circuit is formed. In addition, the insulating piece itself is not worn or oxidized due to flow of current, thereby maintaining stability and long-term reliability of the closed circuit.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

REFERENCE NUMBERS IN THE DRAWINGS

Figure 1:
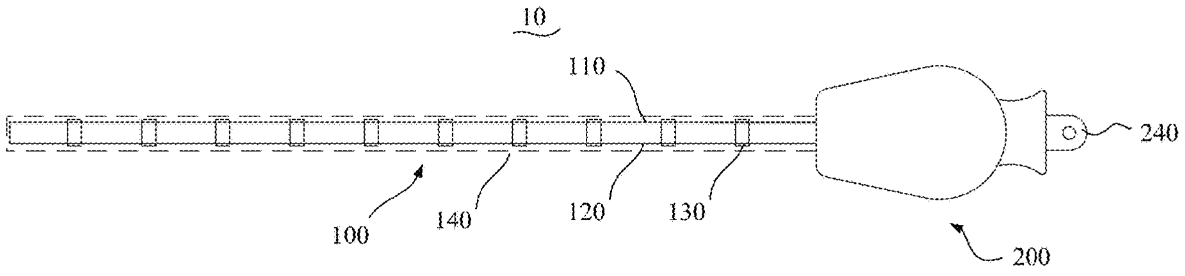
FIG. 1 is a schematic diagram of a lighting device shown in an off state according to a first embodiment of the present disclosure.
Figure 2:
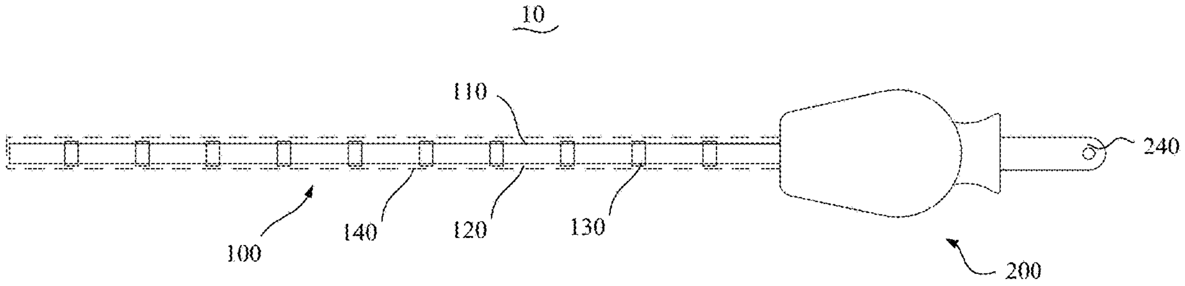
FIG. 2 is a schematic diagram of the lighting device shown in a turn-on state according to the first embodiment of the present disclosure.
Figure 3:
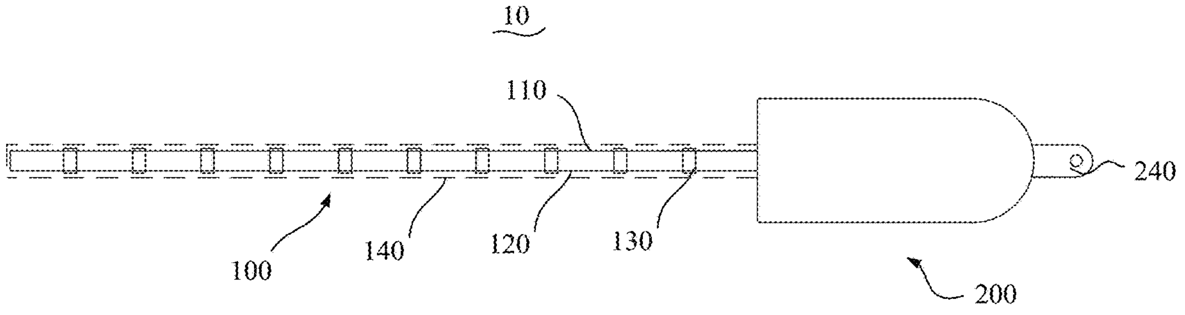
FIG. 3 is a schematic diagram of the lighting device shown in the off state according to a second embodiment of the present disclosure.
Figure 4:
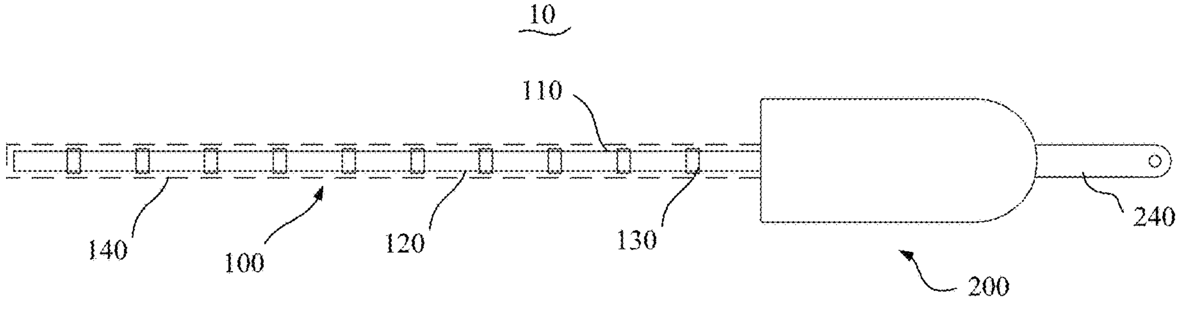
FIG. 4 is a schematic diagram of the lighting device shown in the turn-on state according to the second embodiment of the present disclosure.

10—lighting device; 100—lighting assembly; 110—first wire; 120—second wire; 130—lamp bead; 140—protective cover; 200—power control assembly 210—housing; 210 A—mounting cavity; 210B—first accommodating groove; 210C—second accommodating groove; 211—first shell; 212—second shell; 2121—assembling portion; 2122—flipping portion; 213—third limiting portion; 214—fourth limiting portion 215—first protruding limiting portion; 2151—first notch; 216—second protruding limiting portion; 2161—second notch; 217—first limiting structure; 218—second limiting structure; 219—third limiting structure; 220—first power supply; 230—conductive structure; 231—first conductive piece; 2311—first fixing portion; 2312—third elastic contact portion; 232—second power supply; 233—conductor; 2331—mounting portion; 2332—first elastic contact portion; 2333—second elastic contact portion; 240—insulating piece; 241—driving portion; 2411—mounting hole; 242—blocking portion; 243—first limiting portion; 244—second limiting portion; 250—second conductive piece; 251—second fixing portion; 252—fourth elastic contact portion.

The realization of the objectives, functional features, and technical characteristics of the present disclosure is further described in conjunction with embodiments and with reference to the accompanying drawings.

DETAILED DESCRIPTION

In order to make the purpose, technical solutions, and advantages of the present disclosure clear, the following section will further describe the embodiments of the present disclosure in detail with reference to the accompanying drawings.

When the following description refers to the drawings, the same numbers in different drawings refer to the same or similar elements unless otherwise indicated. The implementations described in the following exemplary embodiments do not represent all implementations consistent with the present disclosure. Rather, they are merely examples of apparatus and methods consistent with certain aspects of the present disclosure, as detailed in the appended claims.

It should be understood in the description of the present disclosure that terms such as "first" and "second" are only used for the purpose of description, rather than being understood to indicate or imply relative importance or hint the number of indicated technical features. Thus, the feature limited by "first" and "second" can explicitly or impliedly include at least one feature. Unless otherwise indicated, the term "a plurality of" means two or more. The term "and/or" depict relationship between associated objects and there are three relationships thereon. For example, A and/or B may indicate A exists alone, A and B exist at the same time, and B exists alone. The character "/" generally indicates that the associated object is alternative. The terms "first", "second", "third", etc. in the present disclosure are used only to distinguish similar objects and do not imply a specific ordering of objects.

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. As used herein, the term "and/or" includes any and all combinations of one or more of the associated listed items.

As shown in FIGS. 1-4, a first embodiment of the present disclosure provides a lighting device 10. The lighting device comprises a lighting assembly 100 and a power control assembly 200.

The lighting assembly comprises a first wire 110, a second wire 120, and a light source. The light source comprises lamp beads 130. The lamp beads 130 are disposed at intervals, and a positive electrode and a negative electrode of each of the lamp beads 130 are respectively connected to the first wire 110 and the second wire 120. The lamp beads 130 are LED lamp beads, so the light source is a light strip. Of course, in other embodiments, the lamp source may be a bulb. In one embodiment, the first wire 110 and the second wire 120 may be aluminum wires, copper wires, iron wires, etc. In other embodiments, the lighting assembly 100 of the lighting device further comprises a base layer. The base layer may be a circuit board made from materials such as polyvinyl chloride (PVC), polyester film (PET), polyethylene (PE), etc. The circuit board may be rigid or flexible, and the first wire 110 and the second wire 120 may be circuit layers coated on the base layer. Therefore, a specific form of the lighting assembly 100 of the present disclosure is not limited thereto.

In order to improve a lighting effect of the lighting device 10, the lamp beads 130 are able to emit lights of different colors, such as red, green, yellow, etc., which is not limited thereto. Specifically, each of the lamp beads 130 is able to emit lights of different colors, or the lamp beads 130 emitting lights of different colors are disposed at intervals, which are not limited in the present disclosure.

Furthermore, as shown in FIGS. 1-4, the lighting assembly 100 of the lighting device further comprises a protective cover 140. The protective cover 140 completely covers the first wire 110, the second wire 120, and the lamp beads 130, or the protective cover 140 only covers the first wire 110 and the second wire 120. By such design, service life of the first wire 110 and the second wire 120 increases, and the first wire 110 and the second wire 120 are prevented from being broken by external force. The protective cover 140 is transparent and may be made of plastic material.

Figure 5:
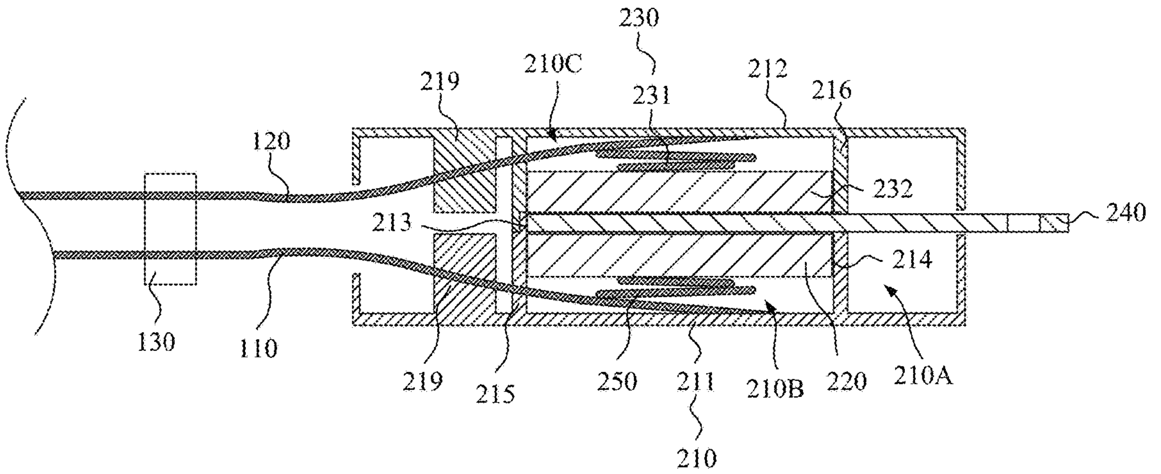
FIG. 5 is a cross-sectional schematic diagram of the lighting device shown in the off state according to the first embodiment of the present disclosure.
Figure 6:
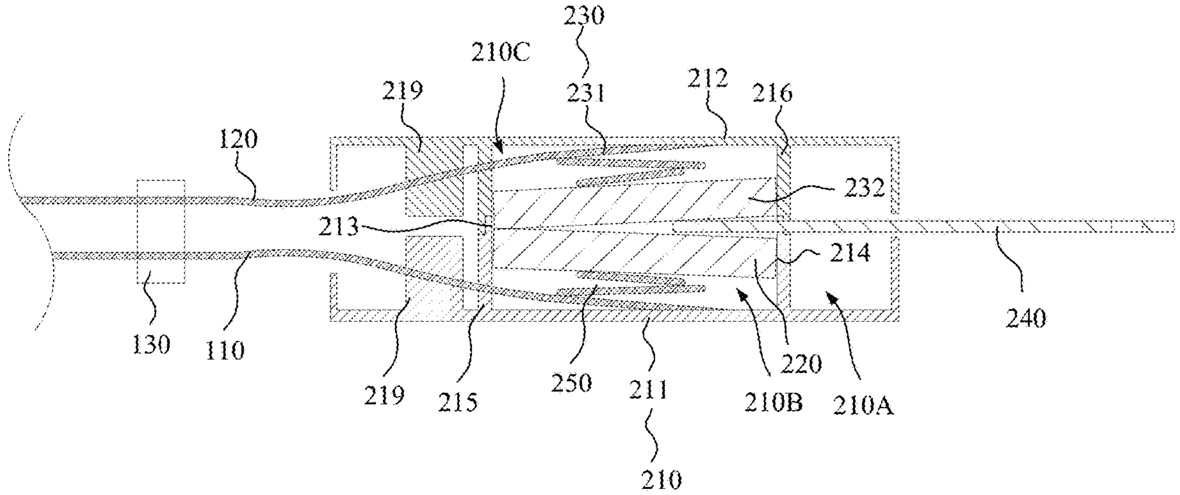
FIG. 6 is a cross-sectional schematic diagram of the lighting device shown in the turn-on state according to the first embodiment of the present disclosure.
Figure 14:
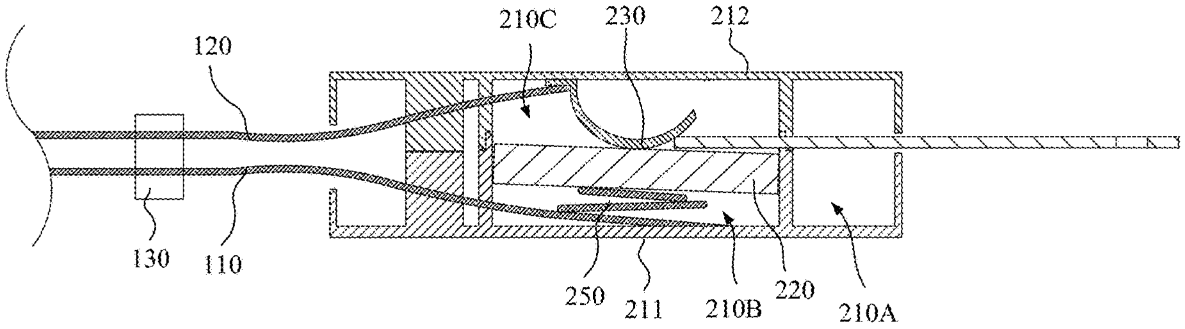
FIG. 14 is a cross-sectional schematic diagram of the lighting device according to a third embodiment of the present disclosure.
Figure 15:
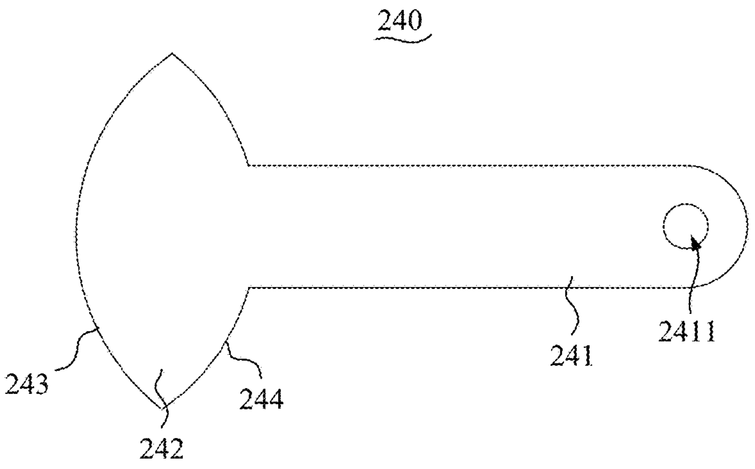
FIG. 15 is a schematic diagram of the isolating piece according to embodiments of the present disclosure.

As shown in FIGS. 5, 6, and 14, the power control assembly 200 comprises a housing 210, a first power supply 220, a conductive structure 230, and an insulating piece 240. The first power supply 220, the conductive structure 230, and the insulating piece 240 are disposed in the housing 210. The first wire 110 is electrically connected to the first power supply 220, and the second wire 120 is electrically connected to the conductive structure 230. The first power supply 220 comprises at least one first battery, such as one first battery, two first batteries, etc. As shown in FIG. 14, the first power supply 220 of the lighting device 10 of the present disclosure comprises only one first battery.

The insulating piece 240 is disposed between the first power supply 220 and the conductive structure 230. The insulating piece 240 partially extends out of the housing 210. The insulating piece 240 is capable of switching between an isolation position and a released position under driving of an external force.

As shown in FIG. 6, when the insulating piece 240 is located at the released position, the conductive structure 230 and the first power supply 220 are in contact with each other to form a closed circuit. At this time, the lamp beads 130 emit light. As shown in FIG. 5, when the insulating piece 240 is located at the isolation position, the conductive structure 230 and the first power supply 220 are not in contact with each other, and the closed circuit is not formed. At this time, the lamp beads 130 are off. It is understood that the first wire 110 is electrically connected to one of a positive electrodes and a negative electrode of the first power supply 220, and the conductive structure 230 is electrically connected to the other one of the positive electrodes and the negative electrode of the first power supply 220. For instance, the first wire 110 is electrically connected to the positive electrode of the first power supply

220, and the conductive structure 230 is electrically connected to the negative electrodes of the first power supply 220.

In the lighting device 10 of the embodiment of the present disclosure, the insulating piece 240 is designed to be movable so that the insulating piece 240 is capable of being switched between the isolation position and the released position. When the insulating piece 240 is in the isolation position, the insulating piece 240 isolates the first power supply 220 and the conductive structure 230, which effectively prevents accidental electric shock or short circuit and improves safety of the lighting device 10.

Moreover, since the insulating piece 240 blocks contact between the first power supply 220 and the conductive structure 230 when the insulating piece 240 is in the isolation position, a possibility of accidental contact between the first power supply 220 and the conductive structure 230 or circuit failure caused by external factors (such as dust, moisture, etc.) is reduced, and reliability of the lighting device 10 is enhanced. When the insulating piece 240 is in the released position, the conductive structure 230 is connected to the first power supply, so that the closed circuit is formed. In addition, the insulating piece 240 itself is not worn or oxidized due to flow of current, thereby maintaining stability and long-term reliability of the closed circuit.

In some embodiments, as shown in FIGS. 5, 6, and 14, the conductive structure 230 comprises a first conductive piece 231. The first conductive piece 231 is electrically connected to the second wire 120. The insulating piece 240 is disposed between the first conductive piece 231 and the first power supply 220. The first conductive piece 231 is a conductive elastic sheet or a conductive spring. Optionally, the conductive spring is a conical spring.

The conical spring can provide a larger spring travel and load capacity in a limited space, and the conical spring also has uniform spring characteristics. That is, the relationship between the load and the deflection of the conical spring is relatively stable within the entire spring travel range.

It should be noted that the first conductive piece 231 may be fixed to the second wire 120 by welding, and when the first conductive piece 231 is the conductive spring, the first conductive piece 231 is be formed by bending the first wire 231. Namely, the first conductive piece 231 and the first wire 231 are integrally formed. In the present disclosure, the first conductive piece 231 has a tendency to approach the first power supply 220, so that when the insulating piece 240 is in the released position, the first conductive piece 231 moves toward the first power supply 220 and connects to the first power supply 220. Of course, in some other embodiments, the lighting device 10 comprises a reset spring, and two opposite sides of the reset spring respectively abut against the housing 210 and the first power supply 220, so that the first power supply 220 has a tendency to move toward the first conductive piece 231.

In order to improve connection stability between the first wire 110 and the first power supply 220, as shown in FIGS. 5-6, the lighting device 10 further comprises a second conductive piece 250. The second conductive piece 250 is connected to the first power supply 220 and the first wire 110. The second conductive piece 250 is configured in a form of the first conductive piece 231. In this way, the second conductive piece 250 improves the connection stability between the first wire 110 and the first power supply 220, so that the first power supply 220 has the tendency to approach the conductive structure 230. When the insulating piece 240 is located in the isolation position, the first power supply 220 and the conductive structure 230 are close to each other, thereby improving stability of the closed circuit.

In some embodiments, as shown in FIG. 5, the conductive structure 230 further comprises a second power supply 232. The second power supply 232 is electrically connected to the first conductive piece 231. The insulating piece 240 is disposed between the first power supply 220 and the second power supply 232. The second power supply 232 comprises at least one second battery, such as one second battery, two second batteries, etc. Specifically, the second power supply 232 comprises only one second battery. Namely, both of the first power supply 220 and the second power supply 232 comprise one battery. The first power supply 220 and the second power supply 232 are disposed side by side in a vertical direction, so that the insulating piece 240 is allowed to be located between the first power supply 220 and the conductive structure 230.

Figure 9:
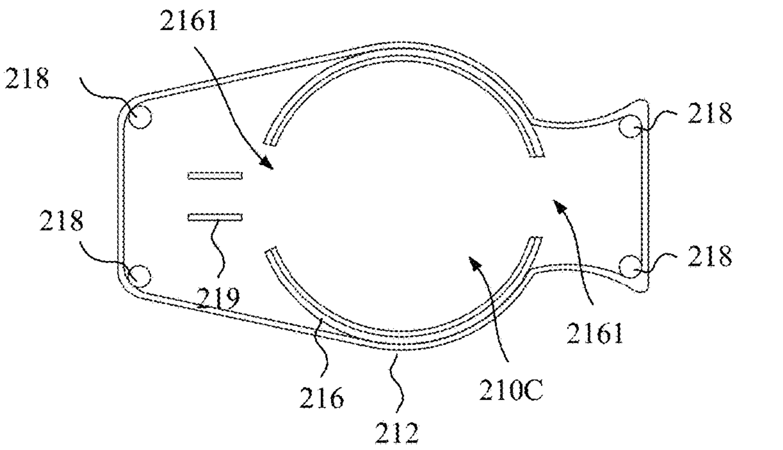
FIG. 9 is a schematic diagram of a second shell of the lighting device according to the first embodiment of the present disclosure.
Figure 10:
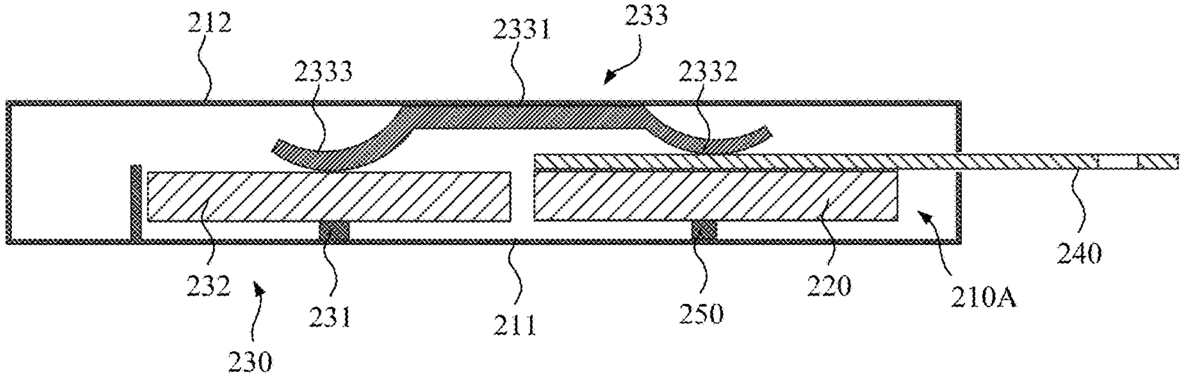
FIG. 10 is a cross-sectional schematic diagram of the lighting device shown in the off state according to the second embodiment of the present disclosure.
Figure 11:
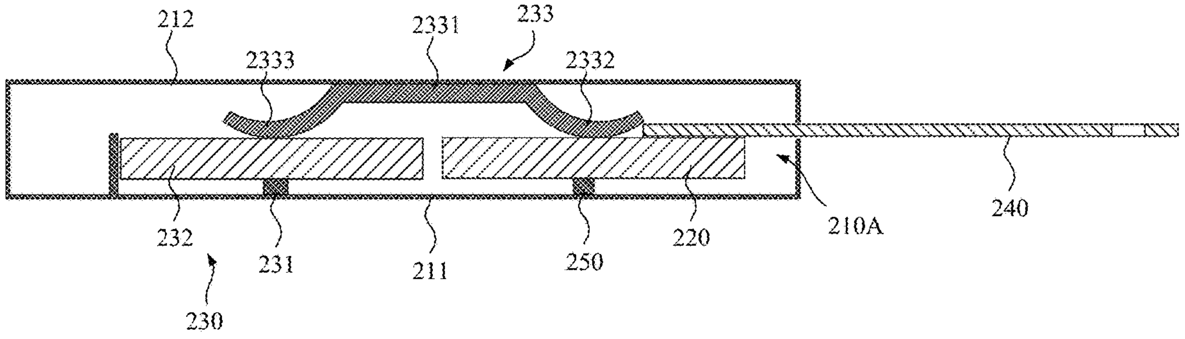
FIG. 11 is a cross-sectional schematic diagram of the lighting device shown in the turn-on state according to the second embodiment of the present disclosure.
Figure 12:
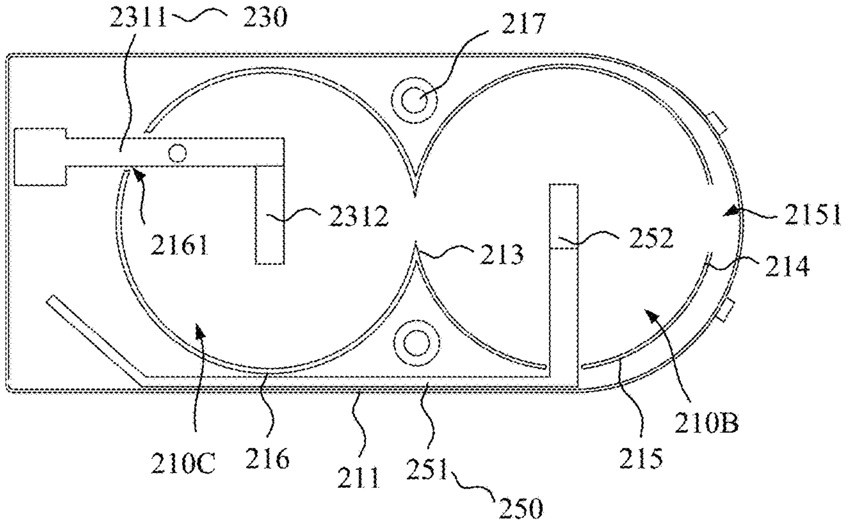
FIG. 12 is a schematic diagram of the first shell of the lighting device according to the second embodiment of the present disclosure.
Figure 13:
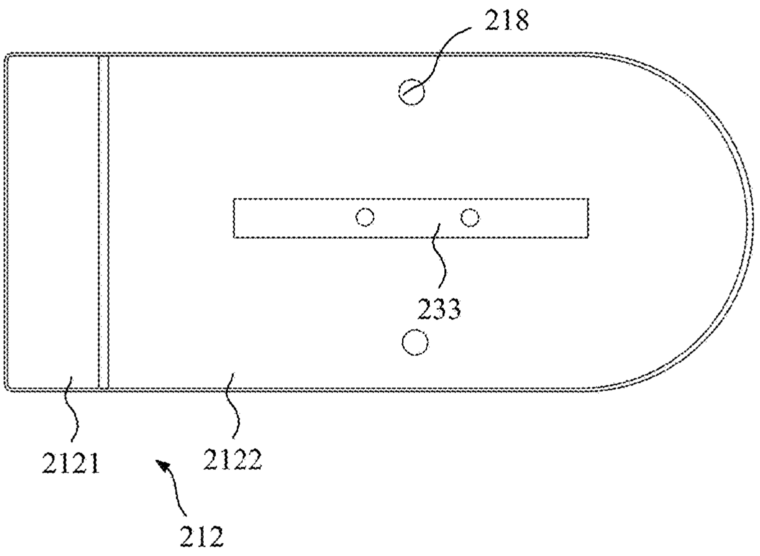
FIG. 13 is a schematic diagram of the second shell of the lighting device according to the second embodiment of the present disclosure.

In some embodiments, as shown in FIGS. 9-10, the first power supply 220 and the second power supply 232 are disposed side by side in a horizontal direction. In order to facilitate a connection between the first power supply 220 and the second power supply 232 to realize circuit connectivity, the conductive structure 230 of the present disclosure further includes a conductor 233. The conductor 233 is configured to connect to the first power supply 220 and the second power supply 232. When the insulating piece 240 is located at the isolation position, the insulating piece 240 is disposed between the conductor 233 and the second power supply 232, or the insulating piece 240 is disposed between the conductor 233 and the first power supply 220. A location of the insulating piece 240 and arrangements of the first power supply 220 and the second power supply 232 are not specifically limited thereto.

In order to improve connection stability between the conductor 233, the first power supply 220, and the second power supply232, as shown in FIGS. 9-10, the conductor 233 comprises a mounting portion 2331, a first elastic contact portion 2332, and a second elastic contact portion 2333. The first elastic contact portion 2332 and the second elastic contact portion 2333 are respectively connected to two ends of the mounting portion 2331. The mounting portion 2331 is fixedly connected to the housing 210. For instance, the mounting portion 2331 is fixed to the housing 210 by bonding, screwing, clamping, snapping, etc. The first elastic contact portion 2332 is configured to connect to the first power supply 220. The second elastic contact portion 2333 is configured to connect to the second power supply 232. The first elastic contact portion 2332 is arched toward a direction close to the first power supply 220. The second elastic contact portion 2333 is arched towards a direction close to the second power supply 232. The first elastic contact portion 2332 and the second elastic contact portion 2333 have a certain deformation capacity, thereby improving the connection stability between the conductor233, the first power supply 220, and the second power supply 232, and thereby improving the connection stability of the closed circuit. The conductor 233 may be a conductive sheet made of aluminum, copper, iron, or other materials.

Furthermore, since the first elastic contact portion 2332 and the second elastic contact portion 2333 are arched, each of the first elastic contact portion 2332 and the second elastic contact portion 2333 defines a slope, so that the insulating piece 240 is allowed to be easily slidably inserted between the first elastic contact portion 2332 and the first power supply 220, or between the second elastic contact portion 2333 and the second power supply 232.

In some embodiments, the first conductive piece 231 and the second conductive piece 250 are conductive sheets.

The first conductive piece 231 comprises a first fixing portion 2311 and a third elastic contact portion 2312 connected to the first fixing portion 2311. The first fixing portion 2311 is fixed to the housing 210. The third elastic contact portion 2312 is arched towards the direction close to the second power supply 232. The second conductive piece 250 comprises a second fixing portion 251 and a fourth elastic contact portion 252 connected to second fixing portion 251. The second fixing portion 251 is fixed to the housing 210. The fourth elastic contact portion 252 is arched toward the direction close to the first power supply 220. In this way, it is easy to mount the first conductive piece 231 and the second conductive piece 250 on the housing 210. Further, the first conductive piece 231 and the second power supply 232 are stably connected, and the second conductive piece 250 and the first power supply 220 are stably connected.

Figure 7:
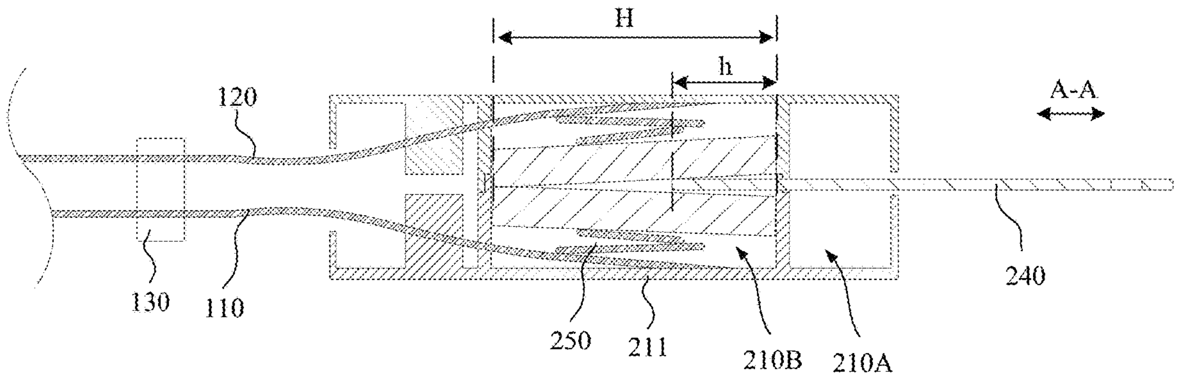
FIG. 7 is a schematic diagram of the lighting device according to the first embodiment of the present disclosure, where an isolating piece thereof is shown in a released position.
Figure 8:
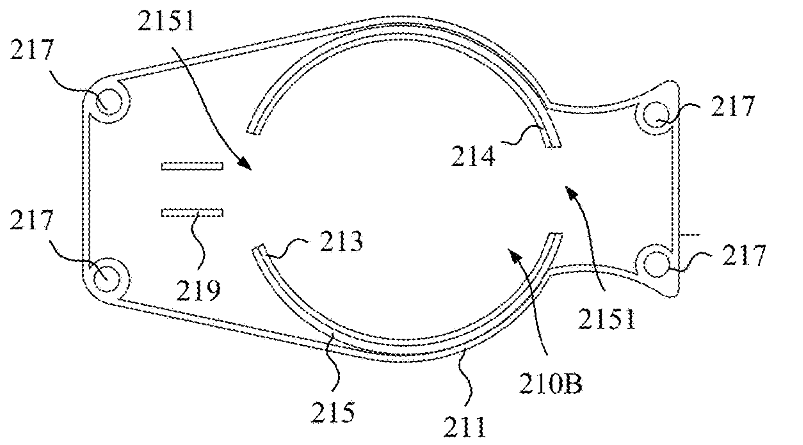
FIG. 8 is a schematic diagram of a first shell of the lighting device according to the first embodiment of the present disclosure.

In some embodiments, as shown in FIG. 7, when the insulating piece 240 is located at the realized position, along a moving direction A-A of the insulating piece 240, a ratio of a length h of a portion contacting the first power supply 220, of the insulating piece 240 to a length H of the first power supply 220 is less than 0.5. In this way, when the insulating piece 240 is in the released position, a contact area between the first power supply 220 and the second power supply 232 is increased to improve the connection stability of the closed circuit.

In some embodiments, as shown in FIGS. 5, 6, 10, 11, and 14, the insulating piece 240 comprises a first limiting portion 243 and a second limiting portion 244. The housing 210 comprises a third limiting portion 213 and a fourth limiting portion 214. When the insulating piece 240 is located at the isolation position, the first limiting portion 243 abuts against the third limiting portion 213. When the insulating piece 240 is located at the released position, the second limiting portion 244 abuts against the fourth limiting portion 214. In this way, a stroke of the insulating piece 240 is controlled, which prevents the insulating piece 240 from being completely pulled out of the housing 210 during movement, and further prevents the insulating piece 240 from being completely extended into the housing 210, thereby improving stability of the movement of the insulating piece 240.

As shown in FIG. 14, the insulating piece 240 comprises a driving portion 241 and a blocking portion 242 connected to the driving portion 241. The driving portion 241 partially extends out of the housing 210, which facilitates a user to hold, so that the insulating piece 240 is allowed to be driven to move. The first limiting portion 243 and the second limiting portion 244 are defined on two opposite sides of the blocking portion 242. Furthermore, one end of the driving portion 241 away from the blocking portion 242 defines a mounting hole 2411, and the mounting hole 2411 is configured to mount an external hanging piece. In this way, a gripping area increases and the insulating pieces 240 is easier to be driven to move.

In doer to facilitate assembling of the lighting device 10, as shown in FIGS. 8, 9, 12, and 13, the housing 210 comprises a first shell 211 and a second shell 212. The first shell 211 is detachably connected to the second shell 212. The first shell 211 and the second shell 212 are connected to enclose a mounting cavity 210A. The first shell 211 comprises a first protruding limiting portion 215 disposed in the mounting cavity 210A. The first protruding limiting portion 215 and a bottom wall of the mounting cavity 210A jointly enclose a first accommodating groove 210B facing the first power supply 220. The first power supply 220 is mounted in the first accommodating groove 210B. The first limiting portion 243 and the second limiting portion 244 are respectively disposed on inner surfaces of two opposite sides of the first protruding limiting portion 215. The first protruding limiting portion 215 defines first notches 2151. By such arrangement, it is convenient to mount the first power supply 220 and to form the first limiting portion 243 and the second limiting portion 244. Two first notches 2151 are provided to facilitate the first wire 110 to extend from an outside into the first accommodating groove 210B to connected to the second conductive piece 250. It is also convenient for the insulating piece 240 to extend from the outside into the first accommodating groove 210B and be located at a top portion of the first power supply 220.

The first shell 211 and the second shell 212 are made from materials such as polypropylene (PP), polyethylene (PE), polystyrene (PS), polyvinyl chloride (PVC), polycarbonate (PC), etc. The first shell 211 and the second shell 212 are detachably connected by snapping, clamping, screwing, etc., which is not limited thereto.

In some embodiments, the second shell 212 comprises a second protruding limiting portion 216 disposed in the mounting cavity 210A. The second protruding limiting portion 216 and the bottom wall of the mounting cavity 210A jointly enclose a second accommodating groove 210C facing the conductive structure 230. The conductive structure 230 is mounted in the second accommodating groove 210C. The second protruding limiting portion defines second notches 2161.

In this way, it is convenient to mount the conductive structure 230. Optionally, a shape of the second accommodating groove 210C is matched with a shape of the second power supply 232, so as to facilitate mounting of the second power supply 232. The second notches 2161 facilitate the second wire 120 to extend into the second accommodating groove 210C and being electrically connected to the conductive structure 230. In the embodiment, the first power supply 220 and the second power supply 232 are disposed side by side in the vertical direction.

In some other embodiments, the first power supply 220 and the second power supply 232 are disposed side by side in the horizontal direction. In the embodiments, in order to facilitate mounting of the first power supply 220 and the second power supply 232, the second protruding limiting portion 216 is disposed on the first shell 211. That is, the first accommodating groove 210B and the second accommodating groove 210C are defined in the first shell 211. Therefore, mounting forms of the first power supply 220 and the second power supply 232 in the housing 210 are not specifically limited thereto.

In some embodiments, the second shell 212 comprises an assembling portion 2121 and a flipping portion 2122 connected to assembling portion 2121. The assembling portion 2121 is fixedly connected to the first shell 211. The flipping portion 2122 is capable of being flipped around a connection portion where the assembling portion 2121 and the flipping portion 2122 are connected. The flipping portion 2122 is snapped with the first shell 211. In this way, the mounting cavity 210A is able to be opened by flipping the flipping portion 2122, so that the first power supply 220 and/or the second power supply 232 is easily replaced.

The first shell 211 comprises first limiting structures 217, the second shell 212 comprises second limiting structures 218, and the first limiting structures 217 are respectively detachably connected to the second limiting structures 218. The first limiting structures 217 may be positioning columns, and the second limiting structures 218 may be positioning grooves. Of course, the first limiting structures 217 may be buckles, and the second limiting structures 218 may be buckling grooves. The first limiting structures 217 and the second limiting structures 218 improves connection stability of the first shell 211 and the second shell 212 while realizing a detachable connection of the first shell 211 and the second shell 212. The present disclosure does not limit structures of the first limiting structures 217 and the second limiting structures 218.

Third limiting structures 219 are disposed on the first shell 211 and/or the second shell 212. The third limiting structures 219 are configured to fix the first wire 110 and the second wire 120. In this way, the first wire 110 and the second wire 120 are stable in position in the housing 210, avoiding poor circuit contact or disconnection due to looseness or displacement of the first wire 110 and/or the second wire 120. Moreover, the first wire 110 and the second wire 120 are fixed by the third limiting structures 219, which effectively protects the first wire 110 and the second wire 120 from physical damage such as vibration, impact or tension in the external environment.

In the drawings of the embodiments, the same or similar numbers correspond to the same or similar components. In the description of the present disclosure, it should be understood that terms such as "upper", "lower", "left", "right", etc., indicate direction or position relationships shown based on the drawings, and are only intended to facilitate the description of the present disclosure and the simplification of the description rather than to indicate or imply that the indicated device or element must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be included in the protection scope of the present disclosure.

What is claimed is:

1. A lighting device, comprising:

a lighting assembly; and a power control assembly;

wherein the lighting assembly comprises a first wire, a second wire, and a light source, and the light source is electrically connected to the first wire and the second wire;

wherein the power control assembly comprises a housing, a first power supply, a conductive structure, and an insulating piece, wherein the first power supply is disposed in the housing, the insulating piece is disposed between the first power supply and the conductive structure, the insulating piece partially extends out of the housing, and the insulating piece is capable of switching between an isolation position and a released position under driving of an external force;

wherein the first wire is electrically connected to the first power supply, the second wire is electrically connected to the conductive structure, when the insulating piece is located at the released position, the conductive structure and the first power supply are in contact with each other to form a closed circuit; and when the insulating piece is located at the isolation position, the conductive structure and the first power supply are not in contact with each other, and the closed circuit is not formed.

2. The lighting device according to claim 1, wherein the conductive structure comprises a first conductive piece, the first conductive piece is electrically connected to the second wire, and the insulating piece is disposed between the first conductive piece and the first power supply.

3. The lighting device according to claim 2, wherein the conductive structure further comprises a second power supply, the second power supply is electrically connected to the first conductive piece, and the insulating piece is disposed between the first power supply and the second power supply.

4. The lighting device according to claim 3, wherein the lighting device further comprises a second conductive piece, and the second conductive piece connects the first power supply to the first wire.

5. The lighting device according to claim 4, wherein the first conductive piece and/or the second conductive piece is a conductive elastic sheet or a conductive spring.

6. The lighting device according to claim 5, wherein the conductive spring is a conical spring.

7. The lighting device according to claim 1, wherein the conductive structure further comprises a first conductive piece, a second power supply, and a conductor, the first power supply and the second power supply are disposed side by side in a horizontal direction, the first conductive piece connects the second power supply to the first wire, and the conductor is configured to connect to the first power supply and the second power supply;

wherein when the insulating piece is located at the isolation position, the insulating piece is disposed between the conductor and the first power supply.

8. The lighting device according to claim 7, wherein the conductor comprises a mounting portion, a first elastic contact portion, and a second elastic contact portion, wherein the first elastic contact portion and the second elastic contact portion are respectively connected to two ends of the mounting portion, the first elastic contact portion is configured to connect to the first power supply, the second elastic contact portion is configured to connect to the second power supply, and when the insulating piece is located at the isolation position, the insulating piece is disposed between the first elastic contact portion and the first power supply.

9. The lighting device according to claim 7, wherein lighting device further comprises a second conductive piece, and the second conductive piece connects the first wire to the first power supply.

10. The lighting device according to claim 9, wherein the first conductive piece comprises a first fixing portion and a third elastic contact portion connected to the first fixing portion, the first fixing portion is fixed to the housing, and the third elastic contact portion is arched towards a direction close to the second power supply;

wherein the second conductive piece comprises a second fixing portion and a fourth elastic contact portion connected to second fixing portion, the second fixing portion is fixed to the housing, and the fourth elastic contact portion is arched toward a direction close to the first power supply.

11. The lighting device according to claim 1, wherein when the insulating piece is located at the released position, a ratio of a length of a portion contacting the first power supply, of the insulating piece to a length of the first power supply is less than 0.5.

12. The lighting device according to claim 1, wherein the insulating piece comprises a first limiting portion and a second limiting portion, the housing comprises a third limiting portion and a fourth limiting portion, when the insulating piece is located at the isolation position, the first limiting portion abuts against the third limiting portion, and when the insulating piece is located at the released position, the second limiting portion abuts against the fourth limiting portion.

13. The lighting device according to claim 12, wherein the insulating piece comprises a driving portion and a blocking portion connected to the driving portion, the driving portion partially extends out of the housing, and the first limiting portion and the second limiting portion are defined on two opposite sides of the blocking portion.

14. The lighting device according to claim 13, wherein one end of the driving portion away from the blocking portion defines a mounting hole, and the mounting hole is configured to mount an external hanging piece.

15. The lighting device according to claim 12, wherein the housing comprises a first shell and a second shell, the first shell is detachably connected to the second shell, the first shell and the second shell are connected to enclose a mounting cavity, the first shell comprises a first protruding limiting portion disposed in the mounting cavity, the first protruding limiting portion and a bottom wall of the mounting cavity jointly enclose a first accommodating groove facing the first power supply, and the first power supply is mounted in the first accommodating groove;

wherein the first limiting portion and the second limiting portion are respectively disposed on inner surfaces of two opposite sides of the first protruding limiting portion, and the first protruding limiting portion defines first notches.

16. The lighting device according to claim 15, wherein the second shell comprises a second protruding limiting portion disposed in the mounting cavity, the second protruding limiting portion and the bottom wall of the mounting cavity jointly enclose a second accommodating groove facing the conductive structure, the conductive structure is mounted in the second accommodating groove, and the second protruding limiting portion defines second notches.

17. The lighting device according to claim 15, wherein the first shell comprises a second protruding limiting portion disposed in the mounting cavity, the second protruding limiting portion and the bottom wall of the mounting cavity jointly enclose a second accommodating groove facing the conductive structure, and the conductive structure is mounted in the second accommodating groove.

18. The lighting device according to claim 17, wherein the second shell comprises an assembling portion and a flipping portion connected to assembling portion, the assembling portion is fixedly connected to the first shell, the flipping portion is capable of being flipped around a connection portion where the assembling portion and the flipping portion are connected, and the flipping portion is snapped on the first shell.

19. The lighting device according to claim 15, wherein the first shell comprises at least one first limiting structure, the second shell comprises at least one second limiting structure, and the at least one first limiting structure is detachably connected to the at least one second limiting structure; and/or third limiting structures are disposed on the first shell and/or the second shell, and the third limiting structures are configured to fix the first wire and the second wire.

20. The lighting device according to claim 1, wherein the light source comprises lamp beads, the lamp beads are disposed at intervals, and the lamp beads are connected to the first wire and the second wire.

* * * * *